United States Patent [19]

Kukesh et al.

[11] Patent Number: 5,080,283
[45] Date of Patent: Jan. 14, 1992

[54] MULTI-COMPONENT APPLICATION SYSTEM

[75] Inventors: Timothy S. Kukesh, Indianapolis; Gregory Mansfield, Zionsville, both of Ind.

[73] Assignee: Glas-Craft, Inc., Indianapolis, Ind.

[21] Appl. No.: 539,170

[22] Filed: Jun. 18, 1990

Related U.S. Application Data

[63] Continuation-in-part of Ser. No. 342,185, Apr. 24, 1989, Pat. No. 4,967,956, which is a continuation-in-part of Ser. No. 080,475, Jul. 3, 1987, Pat. No. 4,324,017, which is a continuation-in-part of Ser. No. 885,006, Jul. 14, 1986, abandoned.

[51] Int. Cl.$^5$ .................... B05B 1/14; B05B 1/28; B05B 7/08
[52] U.S. Cl. .................... 239/9; 239/296; 239/419.3; 239/427.5; 239/552
[58] Field of Search ............ 239/9, 296, 419.3, 425, 239/427.5, 552, DIG. 8, 422, 424.5

[56] References Cited

U.S. PATENT DOCUMENTS

| | | | |
|---|---|---|---|
| 2,732,258 | 1/1956 | Fisher | 239/422 X |
| 2,893,646 | 7/1959 | Batts | 239/419.3 |
| 2,991,015 | 7/1961 | Standlick | 239/552 X |
| 3,212,717 | 10/1965 | Scheinert | 239/422 X |
| 3,741,482 | 6/1973 | Eliason et al. | 239/424.5 X |
| 3,801,009 | 4/1974 | Marshall, III | 239/9 |
| 4,187,983 | 2/1980 | Boyer | 239/9 |
| 4,579,286 | 4/1986 | Stoudt | 239/552 X |

FOREIGN PATENT DOCUMENTS 0038481 4/1981 European Pat. Off. .
3417229 11/1985 Fed. Rep. of Germany ...... 239/296

Primary Examiner—Andres Kashnikow
Assistant Examiner—William Grant
Attorney, Agent, or Firm—William Brinks Olds Hofer Gilson & Lione

[57] ABSTRACT

Method and apparatus provide effective application of plural component material from a plurality of air contained small streams, with stabilized stream formation, division and application and with a substantial reduction of VOC emissions in plural component applications, such as gel coat and wet-out applications in the manufacture of reinforced fiberglass articles. In the method, a flow of compressed air is delivered to an applicator and flows of the plural component materials are mixed and formed into a plurality of small, spaced streams extending from the applicator. The flow of compressed air is divided into a plurality of air flows that are directed about the plurality of small, spaced streams of plural component materials and generally adjacent and parallel to the streams. In apparatus for this method, a source of compressed air is provided and an applicator is adapted for connection to the source of compressed air and one or more sources of the plural component materials. The applicator includes a liquid nozzle for forming mixed plural component material into an array of small, spaced streams extending from the liquid nozzle and an air nozzle for directing a plurality of flows of compressed air generally parallel to the plurality of small, spaced streams from a plurality of passageways spaced about the liquid nozzle.

16 Claims, 3 Drawing Sheets

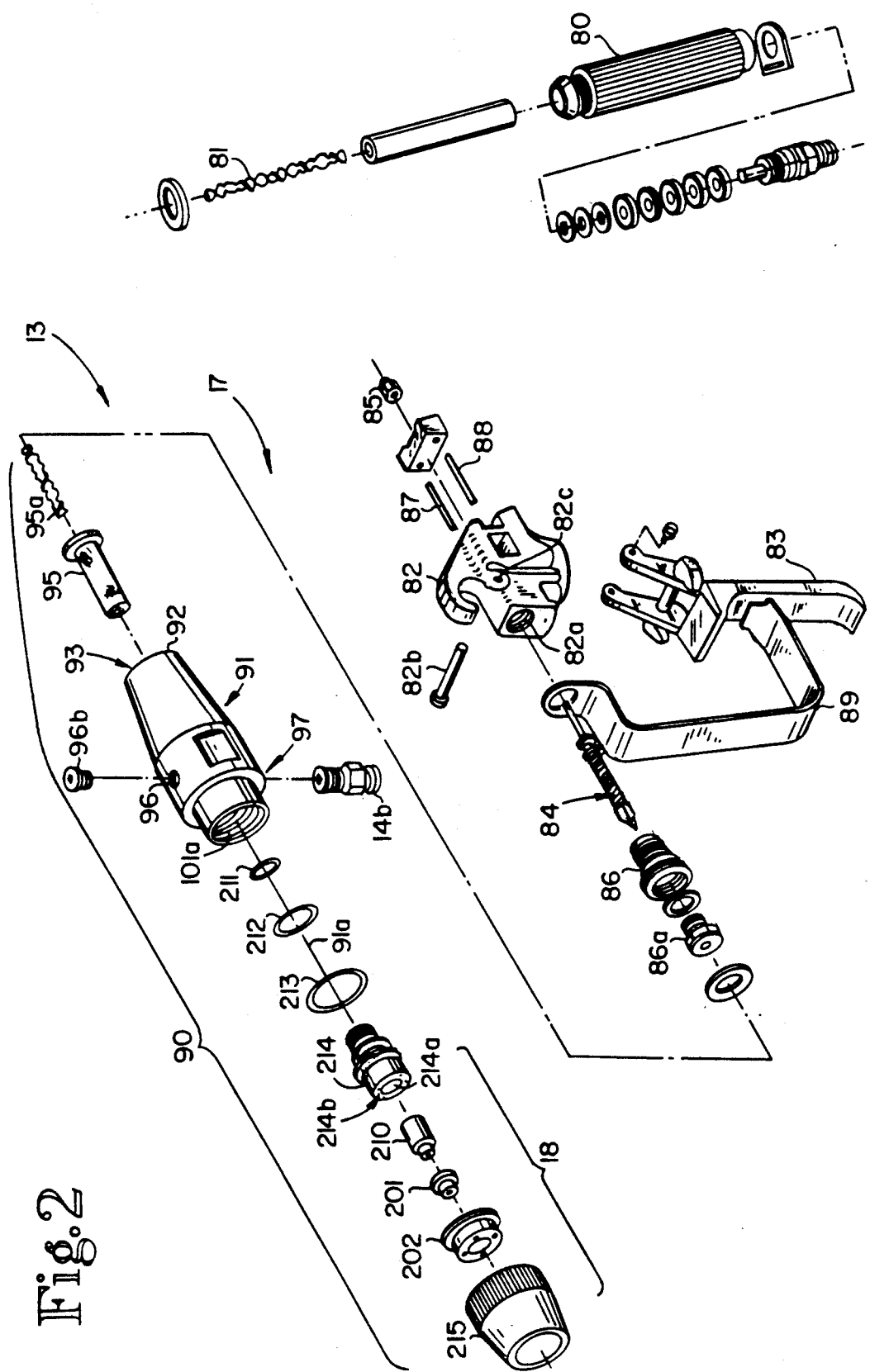

MULTI-COMPONENT APPLICATION SYSTEM

This is a continuation in part of U.S. Pat. application Ser. No. 07/342,185 filed Apr. 24, 1989, now U.S. Pat. No. 4,967,956 which is a continuation in part of U.S. Pat. application Ser. No. 07/080,475 filed July 31, 1987, now U.S. Pat. No. 4,324,017, which is a continuation in part of U.S. Pat. application Ser. No. 06/885,006 filed July 14, 1986, now abandoned.

BACKGROUND ART

The present invention relates generally to multi-component application systems and, more particularly, to an air-stabilized and contained plural component application system and method.

Multi-component application systems have been used, for example, in manufacturing plastic articles by applying resinous materials to a mold or preform for an article, or to pre-arranged fiber reinforcing materials, or to fiber reinforcing materials as they are being applied.

In spraying systems, a liquid resin and a catalyst for the resin are formed into spray particles directed to a substrate where the catalyst and resin react and harden to form the article. In such applications, the resin and catalyst components are preferably mixed together; and the mixture is sprayed onto the substrate. For example, in manufacturing articles with polyester resin, a catalyzing agent for the polyester resin is mixed with the resin; and the resin-catalyst mixture is applied to the substrate. In internal mix systems, the resin and catalyst are mixed within the spraying apparatus; and the mixture is atomized by a spray nozzle and directed onto the substrate. In external mix systems, the resin and catalyst are mixed externally of the apparatus after the resin and catalyst have been atomized. In both external mix and internal mix systems, complete and thorough mixing of the resin and catalyst is important to avoid non-uniform hardening of the resin on the substrate and other undesirable results. Multi-component materials have also been used, for example, in the manufacture of insulating foams by mixing and spraying the components of a foam-producing combination onto a substrate where they produce a hardened foam-like coating. Multi-component application systems have also been developed to divide a pre-mixed flow of plural component material into many small streams for application to fiber reinforcing materials and, in some cases, for application to molds and preforms to provide a coatings layer. Multi-component application systems have thus a multiplicity of applications, each with its specific requirements.

In many spraying systems, large quantities of pressurized air are used to atomize the liquid components. Such systems are expensive to operate and have a number of operational inadequacies. It is expensive to compress air, and the large quantities of compressed air used by existing systems impose a significant operating cost on the system. In addition, the blast of compressed air used to atomize the liquid components carries a significant quantity of spray particles away from the substrate, wastes the expensive material, creates an unclean spray area and generally requires overspray collection systems and contributes to the problem of operating such manufacturing operations safely. Furthermore, the use of large quantities of air during operation of the system can often create an undesirable spread of fumes.

In order to overcome some of the inadequacies attending the use of pressurized air to atomize components dispensed from a spraying apparatus, spraying systems have been developed which incorporate airless atomization techniques.

In prior airless atomization devices, an airless spray nozzle has been used to atomize liquid materials which are pumped at high pressure, that is, pressures generally exceeding 500–600 psi and more frequently in excess of 800 psi, typical operating pressure being 1000–1500 psi. The most commonly used airless nozzle includes an internal, hemispherical passage termination which is cut through by an external, V-shaped groove to form an elongated, elliptical-like orifice. Liquid material pumped at high pressures through such a spray nozzle is forced by the hemispherical termination of the passageway to converge in its flow at and through the elongated orifice. Because of the converging flow at the orifice, the liquid material is expelled through the orifice into a planar, expanding, fan-like film which breaks into spray particles which are carried by their momentum to the article target.

With viscous fluids, high pressures of 1000–1500 psi are required. Such high operating pressures impose a strain on system components reducing their reliability, require generally expensive components in the fluid delivery systems and contribute to the problem of operating such systems safely. Even at high pressures, however, such fan-like films, because they are formed by the convergence of the fluid, include heavy streams at the edges of the planar, fan-like film, which are referred to as "tails". Because of the heavy streamlike flow in the tails, the spray pattern formed by these edge portions of the expanding, fan-like film includes a disproportionate quantity of material and produces a non-uniform deposit with stripes when the spray pattern is swept across a substrate by a spray gun operator. The non-uniform deposit and resulting stripes make the blending of deposited material into a film of uniform thickness virtually impossible.

Past efforts to solve the problem of the tails attending the use of airless spray nozzles have included the insertion of a "preorifice" immediately behind the elongated, elliptical-shaped orifice to concentrate a greater portion of the flow in the central portion of the fan. Although preorifices are helpful, they are not completely satisfactory, adding another source of clogging to the spray gun and another variable factor to be integrated into system operation.

Compressed air has also been used to solve the problem of tails created by airless spray nozzles. See, for example, U.S. Pat. Nos. 3,202,363; 3,521,824; 3,635,400; 3,843,052; and 4,386,739 and Japanese patent publication No. 57-90762. In plural component spraying systems, compressed air has been used to assist in the atomization of plural component materials as shown, for example, in U.S. Pat. Nos. 2,780,496; 2,864,653; 3,799,403; and 4,618,098 and British patent specification No. 735,983.

External mix plural component systems originally included a plurality of separated spray gun or spray nozzles that were directed to blend their patterns together and to mix thereby resins and their catalysts or hardening agents. See, for example, U.S. Pat. Nos. Des. 252,097; 3,893,621; 4,123,007; 4,618,098; and 4,713,257.

In prior plural component application systems where the flow of plural component material is divided into many small streams, such as the system shown, for example, in European Patent No. 0,038,481, each of the streams tends to divide unpredictably and unreliably into segments of varying lengths, due to varying environmental factors and fluid flow characteristics, and the many streams of plural component material frequently create undesirable VOC emissions, that is emissions of volatile organic solvent vapors, such as styrene vapors, into the workplace.

SUMMARY OF THE INVENTION

The invention includes method and apparatus providing effective application from a plurality of small streams, with stabilized stream formation, division and application and with a substantial reduction of VOC emissions in plural component applications, such as gel coat and wet-out applications in the manufacture of reinforced fiberglass articles. The method and apparatus of the invention provide a compact, well defined and easily used pattern of plural component material with substantial containment of the plural component materials and reduced contamination of the work environment from, from example, an inexpensive, lightweight, easy-to-maneuver applicator, or an applicator with a fiber chopper.

In a preferred method of the invention, a flow of compressed air is delivered to an applicator and flows of the plural component materials are mixed and formed into a plurality of small, spaced streams extending from the applicator. The flow of compressed air is divided into a plurality of air flows that are directed about the plurality of small, spaced streams of plural component materials and generally adjacent and parallel to the streams. The plural component material streams are substantially confined by their air flow, and their break-up is stabilized and vaporous emissions are confined and reduced.

In a preferred apparatus of the invention, a source of compressed air is provided and an applicator is adapted for connection to the source of compressed air and one or more sources of the plural component materials. The applicator includes a liquid nozzle for forming mixed plural component material into an array of small, spaced streams extending from the liquid nozzle and an air nozzle for directing a plurality of flows of compressed air generally parallel to the plurality of small, spaced streams from a plurality of passageways spaced about the liquid nozzle. Preferably, the plurality of air passageways of the air nozzle are equally spaced from, and about, the liquid nozzle, on four sides thereof, and the passageways are surrounded by small cavities in the face of the air nozzle.

The invention permits more effective application of the mixed plural component materials at low liquid pressures and low air volumes, substantially lower than those commonly used in spraying. The invention permits an inexpensive, easily used application system for plural component materials with minimal contamination of the workplace environment during its operation.

Further advantages and more specific details of the invention will be set forth hereafter in conjunction with the drawings and detailed description of the best modes of the invention.

BRIEF DESCRIPTION OF THE DRAWINGS

FIG. 2 is an exploded view of an applicator for plural component material adapted to practice the invention.

DESCRIPTION OF BEST MODE OF THE INVENTION

Figure 1:
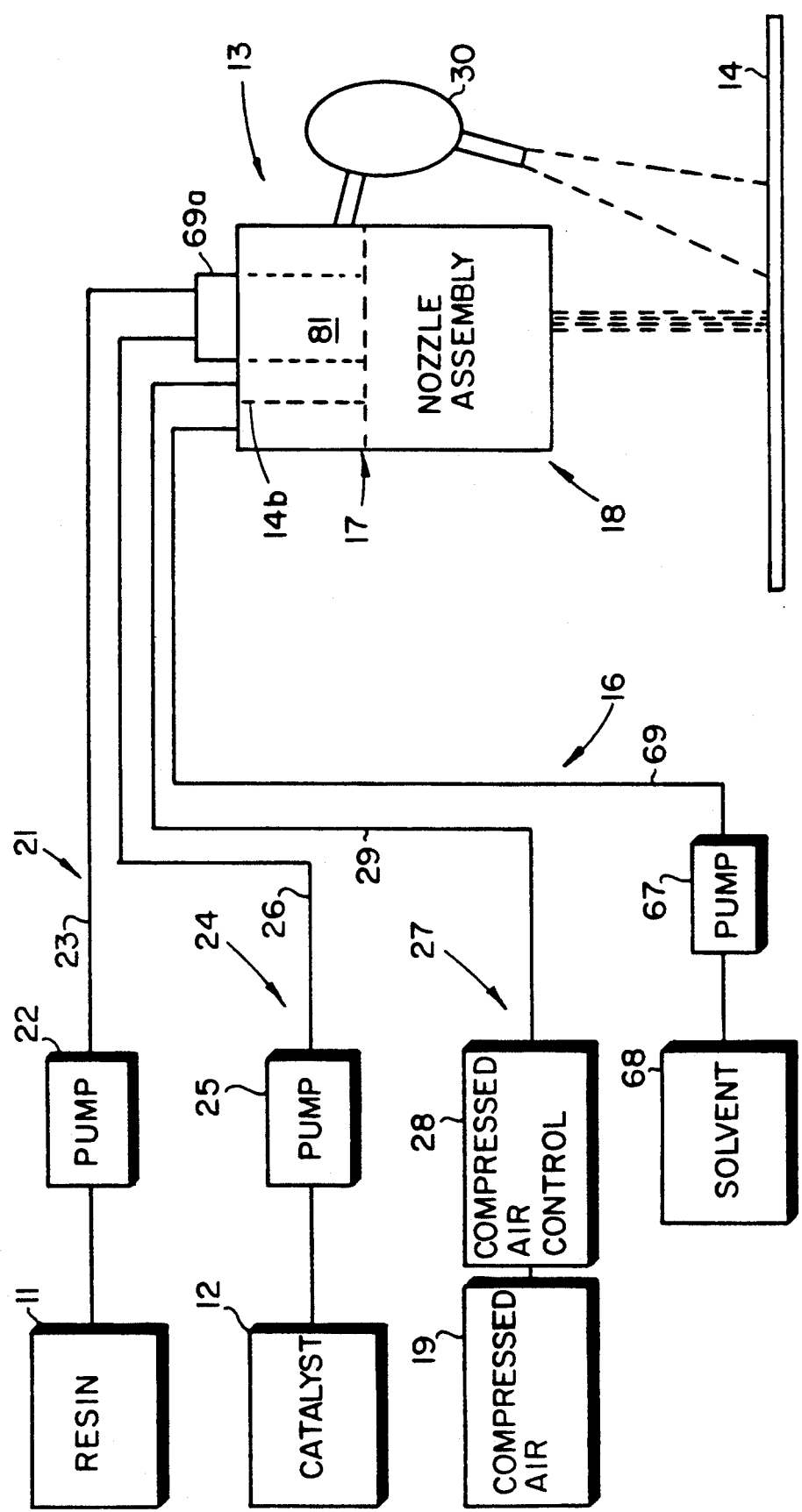
FIG. 1 is a diagrammatic drawing of a system of the invention.

FIG. 1 illustrates a preferred system of the invention for the manufacture of fiber reinforced plastic articles; FIG. 2 illustrates a preferred embodiment of a hand-held, applicator means 13; and FIG. 3 illustrates the nozzle assembly 201, 202 at the front of the applicator 13. FIG. 1 shows the applicator 13 adapted for use with a chopper 30. The apparatus and method of this invention, however, do not require a chopper. Where a chopper is used, the applicator 13 may be fitted with a chopper 30 by attaching it to the applicator body 17 by means of a bolt fastener (not shown).

FIG. 1 schematically illustrates an internal mix, plural component application system of the invention. The system includes a first source 11 of a first component, e.g., a resinous material; a second source 12 of a second component, e.g., a catalyst for the resinous material; application means 13 for applying a mixture of the first and second components on a substrate 14; a source 19 of compressed air, and delivery means 16 for delivering the resin, catalyst and compressed air to the application means 13 during operation of the system.

The application means 13 is shown in FIG. 2 and preferably comprises a hand-held gun which includes a body 17 with a nozzle assembly 18 at its front. The applicator body 17 can incorporate a mixer 81, 95a to mix the resin and catalyst within body 17, or the resin and catalyst may be mixed externally of the applicator 13 and provided thereto. Nozzle assembly 18 comprises a means 201 for dividing a flow of mixed plural component material into a plurality of small, spaced streams and a means 202 for dividing a flow of compressed air into a plurality of air flows, as shown in FIG. 3, to apply mixed resin and catalyst. Thus, the system of the invention includes a compressed air source 19. Delivery means 16 includes means 21 for delivering the resin, including a resin pump 22 and resin conduit 23, between the source of resin 11 and the applicator body 17; means 24 for delivering catalyst, including a catalyst pump 25 and a catalyst conduit 26, between the source of catalyst 12 and the applicator body 17; and means 27 for delivering compressed air, including a compressed air control 28 and an air conduit 29, between compressed air source 19 and applicator body 17.

As described below, a flow of resin from resin source 11 and a flow of catalyst from catalyst source 12 are delivered to a connection block 69a where they are combined and delivered to applicator body 17. In the apparatus illustrated by FIG. 1 and FIG. 2, the catalyst and resin are mixed by a mixer or mixers 81, 95a and directed as a mixture of catalyst and resin to nozzle assembly 18 which directs a plurality of resin-catalyst streams at substrate 14. Nozzle assembly 18 includes a liquid nozzle 201 to which the mixed resin and catalyst is directed and which forms the mixed resin and catalyst into an array of small, spaced streams and also includes an air nozzle to form the flow of compressed air into a plurality of compressed air streams from a plurality of orifices located about the liquid nozzle 201. Thus, mixed resin and catalyst can be applied to substrate 14, with or without reinforcing fibers. Substrate 14 can be a mold for an article, such as a boat hull, boat part, shower stall or the like, or can be a partially formed article. Any one of a number of plural component materials and resins and catalysts can be used in systems of this invention.

The system may also, as indicated above, include a chopper 30 carried by applicator means 13 to dispense strands of fiberglass onto the substrate 14, as shown in FIG. 1, to reinforce the article of manufacture formed on substrate 14.

One form of applicator 13 for coatings operations is shown in FIG. 2. The applicator 13 is a small, lightweight, maneuverable spray gun which is adapted for use of this invention. FIG. 2 shows such a spray gun in an exploded view. The spray gun includes a handle member 80 which is hollow and can be provided with a strainer, or, if advisable, a static mixing means 81. The handle member 80 is threaded into a main gun body 82 that includes a further fluid passageway 82a and carries a trigger-like valve actuator 83 and is designed interiorally of the fluid passageway 82 to support a movable valve member 84. Valve member 84 is adapted to provide sealing engagement with the main valve body 86 and to be held in gun body 82 by a fastener 85. Valve member 84 is actuated by the trigger actuator 83 which pivots on an axle 82b carried in a bore 82c that is formed in the gun body 82 more valve actuating rods 87 and 88. Threaded onto the forward part of main valve body 86 is a forward gun body portion 90. The portion of the spray gun represented by members 80 through 89 are adapted from the prior art.

As shown in FIG. 2, the forward portion 90 includes a body 91 adapted at its rear end 92 for threaded attachment to the threaded main valve body 86, which itself fastens valve member 84 and trigger guard 89 to the gun body portion 82 and provides a valved internal opening (not shown) for valve member 84. Rear end 92 of the body 91 includes a threaded bore 93 adapted to be threaded onto the threaded external portion of part 86. The rear portion 92 of body 91 also includes an enlarged central bore (not shown). The enlarged bore is adapted to accept a fluid material strainer 95 and, if needed, a static mixer 95a. Bore 93 and 101a of body 91 communicate with the valved liquid passageway of the spray gun body and direct mixed plural component material forwardly to the nozzle assembly 18 held by threaded nut 215 on the forward portion of body 91. Body 91 further comprises a pair of bores 96 and 97 extending transversely of the body, each intersecting one of another pair of bores, not shown, that extend parallel to the central body axis 91a from bores 96 and 97 to the front of body 91. Either passageway 96 or 97 can be used for the connection 14b and the attachment of the compressed air conduit 29 to the applicator 13. The unused passageway, either 96 or 97, would be blocked by a threaded plug.

As further shown in FIG. 2, spray forming means 18 comprises a threaded fitting 214 which is threaded into threaded bore 101a formed in the forward portion of body 91. O-ring seals 211 and 212 are compressed between threaded member 214 and the internal surface of the body 91 to provide a sealed engagement of bore 214a of threaded member 214 with the bores 101a and 93 of spray gun body 91. When threaded fitting 214 is threaded into body portion 91, fitting 214 compresses O-ring seals 211 and 212 against body portion 91 and also forms a sealed annular air chamber (not shown) between body portion 91 and fitting 214. Compressed air flows through fitting 14b into body portion 91, passageway 97 and forwardly through an unshown passageway to the sealed annular air chamber formed between fitting 214 and body 91. The compressed air then flows from the annular air chamber through passageways 214b in the fitting 214 to air nozzle 202.

The nozzle assembly 18 is attached to body portion 91 of applicator 13 with threaded nut 215. Nozzle assembly 18 includes a liquid nozzle 201 and an air nozzle 202. Liquid nozzle 201 forms plural component material flowing through passageways 93, 101a and 214a into a plurality of small spaced streams extending from the liquid nozzle 201. Air nozzle assembly 202 forms the flow of compressed air flowing through connection 14b, passageway 97, the unshown internal passageway of body 91 and annular chamber, and passageways 14b into a plurality of air flows forwardly of the nozzle assembly 18. Air nozzle 202 includes, in its preferred embodiment, a plurality of air passageways that are equally spaced around the liquid nozzle 201 and that form the compressed air into a plurality of compressed air flows that are projected generally parallel to the direction of the plurality of small streams of plural component material.

Figure 3B:
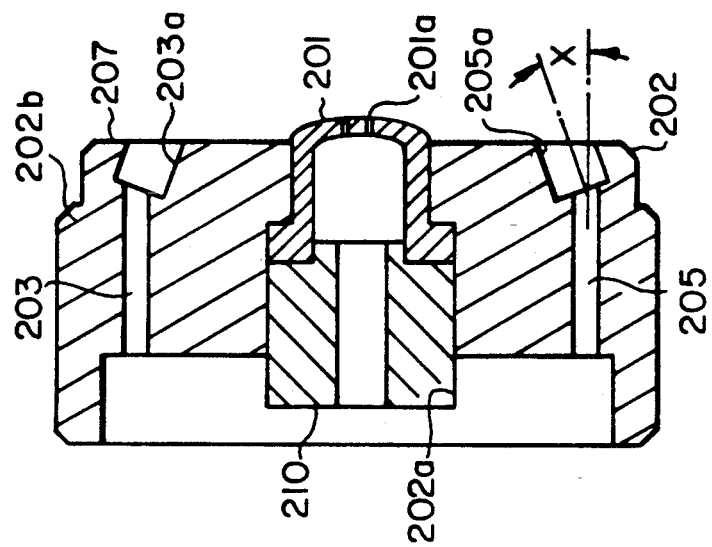
FIGS. 3A and 3B, respectively, are a frontal view and a cross-section through the center of a nozzle means adapted to practice the invention, for example, on an applicator as shown in FIG. 2.
Figure 3A:
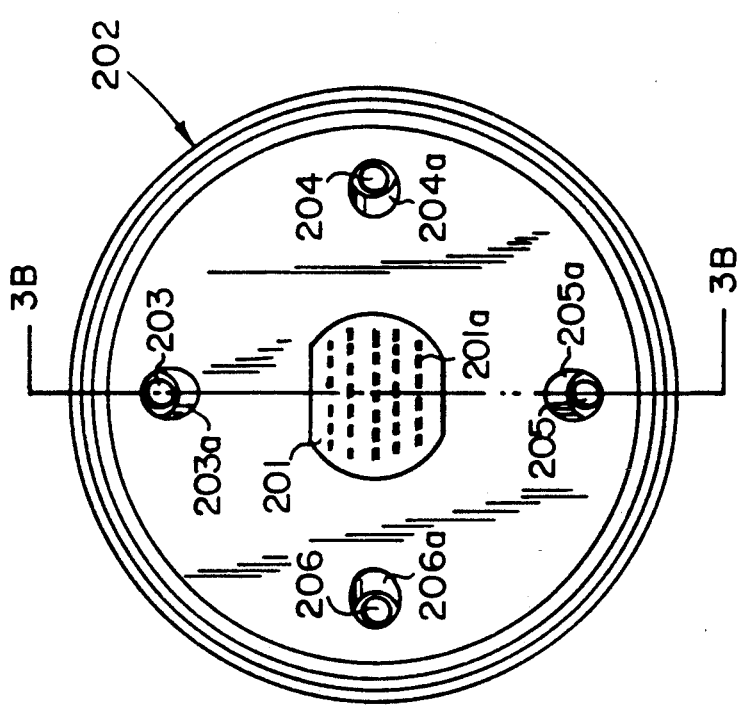

Nozzle assembly 18, and particularly liquid nozzle 201 and air nozzle 202, are shown in greater detail in FIGS. 3A and 3B. As indicated in FIG. 2, the threaded nut 215 fits over the subassembly comprising liquid nozzle 201 and seal 210, which fits into the central opening 202a of air nozzle 202, and air nozzle 202. Threaded nut 215 engages the flanged surface 202b of air nozzle 202 and the subassembly is threaded onto the front of body 91, thereby forming a liquid seal between the central passageways of fitting 214, seal 210 and liquid nozzle 201 and directing the flow of mixed plural component material to the liquid nozzle 201, where it is divided into an array of small, spaced streams by an array of small, spaced openings 201a, as shown in FIGS. 3A and 3B. Preferably, liquid nozzle 201 has more than 5 small, spaced openings arranged in a two dimensional distributed array. Still more preferably, liquid nozzle 201 has a large number of small spaced openings arranged in a two dimensional array, for example, more than ten.

In the specific nozzle assembly 18, shown in FIGS. 3A and 3B, the liquid nozzle 201 has 33 small holes arranged in a two dimensional distributed array. Liquid nozzle 201 is provided with a flow of mixed plural component material at very low pressures on the order of 50-100 pounds per square inch. Each small hole has, for example, a diameter of about 0.010 inch and the holes are, for example, spaced apart about 0.060 inch, and form the flowing plural component material into 33 fine streams in a two dimensional distributed array. Liquid nozzle 201 is of a type known in the art and may be provided with a variety of hole sizes and arrangements forming a two dimensional distributed array.

In accordance with the invention, an air nozzle 202 is provided adjacent liquid nozzle 201. Air nozzle 202 provides from compressed air, four flows of air on four sides of the spaced array of 33 streams of plural component material from liquid nozzle 201. The four flows of air virtually surround the spaced array of streams and entrap and contain vapors emitted from the streams. In addition, the four flows of air break the surface tension of the streams and provide improved wetting of fibers when used to wet-out pre-deposited fibers and when used with a fiber chopper to deposit wetted reinforcing fibers on a substrate. Both such operations are useful in the manufacture of fiber-reinforced plastic articles and the air assist containment of vapors emitted from the plural component materials provides a better working environment.

The flows of compressed air in the embodiment of FIGS. 3A and 3B are formed by four passageways 203, 204, 205 and 206 parallel to both the longitudinal axis of nozzle assembly 18 and to each other. The four passageways 203, 204, 205 and 206 are equally spaced from the central axis of sprinkler nozzle 201 a distance of about three-eighths to about one-half of an inch and lie in the planes that perpendicularly bisect each other and include the central axis of liquid nozzle 201.

In addition, as shown in FIG. 3A, cavities 203a, 204a, 205a and 206a may be formed in the front face 207 of air assist nozzle 202 around air passageways 203, 204, 205 and 206, respectively. Cavities 203a, 204a, 205a and 206a are formed in the front face 207 in such a manner that they extend inwardly at an acute angle with respect to air passageways 203, 204, 205 and 206, respectively, but in such a manner that there are no surfaces forwardly of the air orifices 203b, 204b, 205b and 206b that lie within the imaginary extension of the air passageways 203, 204, 205 and 206. Cavities 203a, 204a, 205a and 206a tend to form low-pressure areas adjacent the air orifices 203b, 204b, 205b and 206b which "often" the edges of the compressed air jets projected from front face 207 of the air assist nozzle 202 as the compressed air jets extend forwardly from the front face 207 of the air nozzle. The acute angle x formed by the central axis of cavities 203a, 204a, 205a and 206a and the longitudinal axis of air passageways 203, 204, 205 and 206 may vary; with the specific embodiment described above, effective operation can be obtained with cavities 203a, 204a, 205a and 206a lying at an angle x equal to about 20° if the cavities have a diameter of about 0.138 inch and a depth of about 0.118 inch; and the diameter of air passageways 203, 204, 205 and 206 is about 0.062 inch.

The invention thus provides a further useful method of deposition of mixed plural component material by providing a low pressure flow of mixed plural component material, dividing the low pressure flow into a spaced array of small streams of plural component material and providing an air containment flow of air adjacent to but spaced from the spaced array of streams to capture and contain vapors emitted from the plural component material and to break the streams of the spaced array into large fragments and particles. In the preferred method shown, four flows of compressed air are provided adjacent four sides of the liquid nozzle to virtually surround the spaced array of streams with softened and expanding air flow that substantially contains and stabilizes the formation, break-up and application of the plurality of streams.

The spraying system of this invention can be advantageously applied not only to resin-catalyst systems for the formation of fiber reinforced plastic products such as boats, shower stalls and the like, but to other plural component systems for industrial applications.

Such systems provide substantially improved plural component application. Systems of this invention are less expensive to manufacture, operate and maintain and are easier and safer to use through their improved operation.

While what has been described constitutes a presently most preferred embodiment, the invention can take many other forms. Accordingly, it should be understood that the invention is to be limited only insofar as is required by the scope of the following claims.

We claim:

1. A plural component application system, comprising:
    a first source of first component of a plural component material;
    a second source of second component of a plural component material;
    application means for applying mixed first and second components on a substrate;
    liquid delivery means for providing a flow of said first component from said first source and for providing a flow of said second component from said second source;
    mixing means for mixing said first and second components and for providing a flow of the mixture of said first and second components for application by said application means;
    a source of compressed air; and
    air delivery means for providing a flow of compressed air from said compressed air source to said application means,
    said application means including a nozzle assembly liquid nozzle means for forming the mixture of first component and second component into a plurality of small, spaced streams in a two dimensional distributed array centrally located within said nozzle assembly and means for directing a plurality of flows of compressed air about the array of small, spaced streams of mixed plural component material.

2. The system of claim 1 wherein said first component comprises a resinous material and said second component comprises a catalyst for said resinous material.

3. The system of claim 1 wherein said application means includes mixing means upstream of said liquid nozzle means.

4. The system of claim 1 wherein said plurality of air flows from said nozzle assembly comprises four flows of compressed air directed from four sides of the plurality of small, spaced streams.

5. The system of claim 1 wherein the nozzle assembly comprises:
    a nozzle body having a central opening at its longitudinal center line in which the liquid nozzle means is positioned; and
    four air orifices being equally spaced from and about the longitudinal center line of the nozzle body for directing said plurality of flows of compressed air about the liquid nozzle means,
    said air orifices being positioned to direct the plurality of flows of compressed air forwardly of the nozzle body and generally parallel to its longitudinal center line.

6. The system of claim 5 wherein each of said air orifices for directing a plurality of flows of compressed air is surrounded by a cavity.

7. A method of applying a plurality of mixed components, comprising:
    delivering a flow of a first component to an application means;
    delivering a flow of a second component to said application means;
    delivering a flow of compressed air to said application means;
    mixing said first component and said second component and forming the mixture of said first and second components into a plurality of small, spaced streams of mixed plural component material in a two dimensional distributed array extending from the application means;

directing a plurality of flows of compressed air from a plurality of locations substantially surrounding and closely adjacent said array of small, spaced streams of mixed plural component material; and directing the plural component material from the small, spaced streams and the plurality of flows of compressed air for application of the plural component material on a substrate.

8. A method of applying a plurality of mixed components, comprising:

providing a flow of a first component;

providing a flow of a second component;

providing a flow of compressed air;

mixing said first component and said second component and providing a flow of mixed first and second component;

dividing the flow of the mixture of first and second components into a plurality of small, spaced streams extending from an application means in a two dimensional distributed array; and dividing the flow of compressed air into a plurality of air flows generally surrounding the array of small, spaced streams and directing the plurality of air flows substantially parallel to the plurality of small, spaced streams.

9. The method of claim 8 wherein said first component and said second component are mixed within said spraying means.

10. A nozzle assembly for use in a plural component application system, comprising:

a liquid nozzle having a plurality of small, spaced passageways in a two dimensional distributed array centrally located within said liquid nozzle and adapted to project a plurality of small, spaced streams of plural component material forward of the liquid nozzle; and a body forming an opening in its face permitting the body to be positioned adjacent the liquid nozzle, said body having a plurality of air passageways equally spaced about the opening and adapted to direct a plurality of flows of compressed air forwardly of the body, generally parallel to each other and perpendicular to the face of the body.

11. The nozzle of claim 10 wherein said plurality of passageways to direct flows of compressed air forwardly of the body comprises a first pair of passageways centered upon and equally spaced on opposite sides of the body opening and a second pair of passageways centered upon and equally spaced on opposite sides of the body opening and further being generally equally spaced from each of the first pair of air passageways.

12. The nozzle of claim 11 wherein each of said air passageways is surrounded by a cavity at the front face of the nozzle.

13. The nozzle of claim 12 wherein the central axis of the cavities lie at an acute angle with respect to the central axis of the air passageways.

14. The nozzle of claim 13 wherein the cavities have an inside diameter of about 0.138 inch and a depth of about 0.118 inch and their central axes lie at an angle of about 20° with respect to the central axes of the air passageways.

15. The nozzle of claim 10 wherein the liquid nozzle has more than 5 small spaced openings in the distributed array.

16. The nozzle of claim 15 wherein the liquid nozzle has more than 10 small spaced openings in the distributed array.

* * * * *